United States Patent [19]
Foo

[11] Patent Number: 5,700,304
[45] Date of Patent: Dec. 23, 1997

[54] FILTER WITH PROTECTIVE SHIELD

[75] Inventor: Chong-Kim Foo, Wavre, Belgium

[73] Assignee: Donaldson Company, Inc., Minneapolis, Minn.

[21] Appl. No.: 610,116

[22] Filed: Feb. 29, 1996

[51] Int. Cl.$^6$ .................................................. B01D 27/06
[52] U.S. Cl. ............................. 55/337; 55/498; 55/510
[58] Field of Search ........................... 55/510, 511, 497, 55/498, 502, 515, 516, 518, 521, 337, 486, 309; 210/493.1, 493.2, 493.5

[56] References Cited

U.S. PATENT DOCUMENTS

| | | | |
|---|---|---|---|
| 3,078,650 | 2/1963 | Anderson et al. | 55/337 |
| 3,584,439 | 6/1971 | Gronholz | 55/337 |
| 3,771,959 | 11/1973 | Fletcher et al. | 55/518 X |
| 4,139,354 | 2/1979 | Giles | 55/510 X |
| 4,322,230 | 3/1982 | Schoen et al. | 55/502 X |
| 4,491,460 | 1/1985 | Tokar | 55/337 |
| 4,564,376 | 1/1986 | Billiet | 55/498 X |
| 4,720,292 | 1/1988 | Engel et al. | 55/337 |
| 4,838,901 | 6/1989 | Schmidt et al. | 55/510 X |
| 4,861,479 | 8/1989 | Solzer | 55/497 X |
| 4,863,602 | 9/1989 | Johnson | 55/486 X |
| 4,890,444 | 1/1990 | Vander Giessen et al. | 55/510 X |
| 5,082,476 | 1/1992 | Kahlbaugh et al. | 55/510 X |
| 5,277,157 | 1/1994 | Teich | 55/510 X |

*Primary Examiner*—Richard L. Chiesa
*Attorney, Agent, or Firm*—Merchant, Gould, Smith, Edell, Welter & Schmidt

[57] ABSTRACT

A filter element is provided. The filter element generally includes a first liner, a region of filter media positioned downstream from the first liner and a screen arrangement positioned along a portion of the first liner downstream surface and oriented to block a portion of the first liner to flow directly therethrough and into a portion of the filter media directly associated therewith. Preferred elements are generally cylindrical, having expanded metal outer and inner liners with pleated paper media positioned therebetween. The preferred screen arrangement includes a polymeric sleeve, partially embedded in one of the end caps. Also according to the invention an overall filter arrangement or assembly is provided. Such an assembly includes the filter element as well as a housing and a precleaner arrangement.

11 Claims, 3 Drawing Sheets

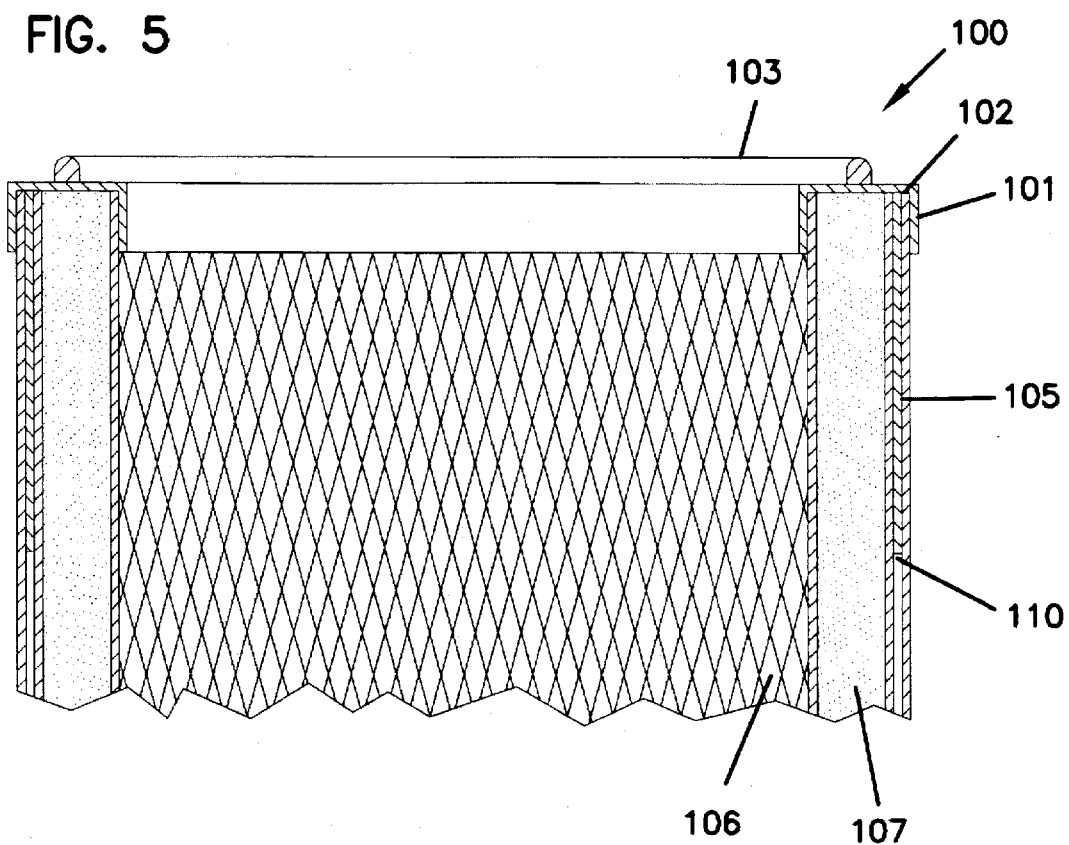

FILTER WITH PROTECTIVE SHIELD

FIELD OF THE INVENTION

Present invention relates to air filter constructions. It relates generally to air filter constructions including an air flow shield arrangement selectively positioned, to advantage.

BACKGROUND OF THE INVENTION

Air filter constructions can be used in a variety of applications. For example they are typically used to remove particulate material from the air intake to engines. Some specific examples of such applications are the air intake systems for construction equipment, over-the-highway trucks, buses, and passenger vehicles.

Typical air-flow arrangements include an air filter element positioned in air flow communication with an engine air intake conduit. The air filter element is typically contained within a housing structure. In many instances, the air filter element is designed as a removable and replaceable portion of the air filter system. That is, the filter element is installed in such a manner that it can be periodically removed and replaced, as it wears out or becomes undesirably loaded with filtered material.

In some constructions, the filter element and housing are designed such that a "precleaning" operation occurs. For example, some housings are designed for air flow directed therein to be initially directed in a circular flow or helical pattern around (or circumscribing) the air filter element. In such arrangements, some particulate material carried in the air flow stream will be directed against the inner wall of the housing, and will drop out of the air flow stream, to the bottom of the housing. Also, as air flow slows, heavier or larger particulates will tend to drop out. Such systems generally include a collection point at the bottom of the housing, from which the particulate material can be periodically discharged. When such a construction is used, then, a certain amount of "precleaning" occurs of particulate material in the air flow stream, before the air flow stream ever actually enters or passes through the filter media of the filter element.

Numerous conventional such systems are known and are commercially available. U.S. Pat. Nos. 3,078,650; 3,584,439; and 4,491,460 include filter systems with such a "precleaner" design. Similar related products are available from Donaldson Company, Inc. of Minneapolis, Minn. under the trade designation CYCLOPAC. Donaldson Company, Inc. is the assignee of the present invention.

SUMMARY OF THE INVENTION

According to the present invention a filter element is provided. The filter element generally comprises a first liner, a region of filter media, and a screen arrangement. The first liner generally has regions open to passage of air therethrough. The first liner generally includes an upstream surface and a downstream surface. The region of filter media is positioned downstream of the first liner. The screen arrangement is generally positioned along a perforated or open portion of the first liner, along its downstream surface, in a position to block an associated portion of the first liner to flow of air directly therethrough and into a portion of the region of filter media. That is, in general the screen arrangement is positioned between the outer liner and the filter media, in a selected position, to block direct flow of air into the filter element at that location.

In a preferred arrangement, the screen arrangement generally comprises a polymeric film or sheet. Preferably, the film is about 0.1 to 1.0 mm thick, typically about 0.5 mm thick, and it comprises polypropylene or polyethylene. Typical screen arrangements will be either 50, 75, 100, 150, 200 or 250 millimeter long, depending on the overall size of the system, with about 10 mm embedded in an associated end cap.

In typical and preferred systems, the first liner comprises an outer liner of expanded metal; and, the region of filter media positioned downstream of the first liner includes pleated paper filter media, preferably with the pleats aligned to extend longitudinally along the system.

In typical preferred arrangements, the film is positioned both between and against a portion of the pleated paper filter media and a portion of the expanded metal liner.

Typical preferred systems include a first end cap in which a portion of the first liner, the region of filter media, and the screen arrangement are embedded. Generally the systems will include first and second opposite end caps, typically circular, with portions of the first liner, and the region of filter media, embedded in both end caps. Typical systems will be generally cylindrical in overall configuration and when pleated paper is used the pleats extend generally longitudinally between the end caps.

Also according to the present invention an overall filter arrangement is provided which includes a housing, a removable and replaceable filter element generally as described above, and a precleaner arrangement constructed and arranged to direct air in a tangential manner, as it enters the housing; i.e., in a circular or helical flow pattern circumscribing or generally directed around the filter element, at least initially. In such arrangements, the screen arrangement is positioned to block air flow as it comes in tangentially, from passing directly into the filter element without first being directed along the circular flow pattern, at least to some extent.

BRIEF DESCRIPTION OF THE DRAWINGS

in FIG. 1 portions being broken away to show internal detail.

FIG. 5 is a schematic, fragmentary, cross-sectional view of an alternate embodiment of a filter element according to the present invention.

DETAILED DESCRIPTION

I. Some Concerns with Conventional Systems

Figure 1:
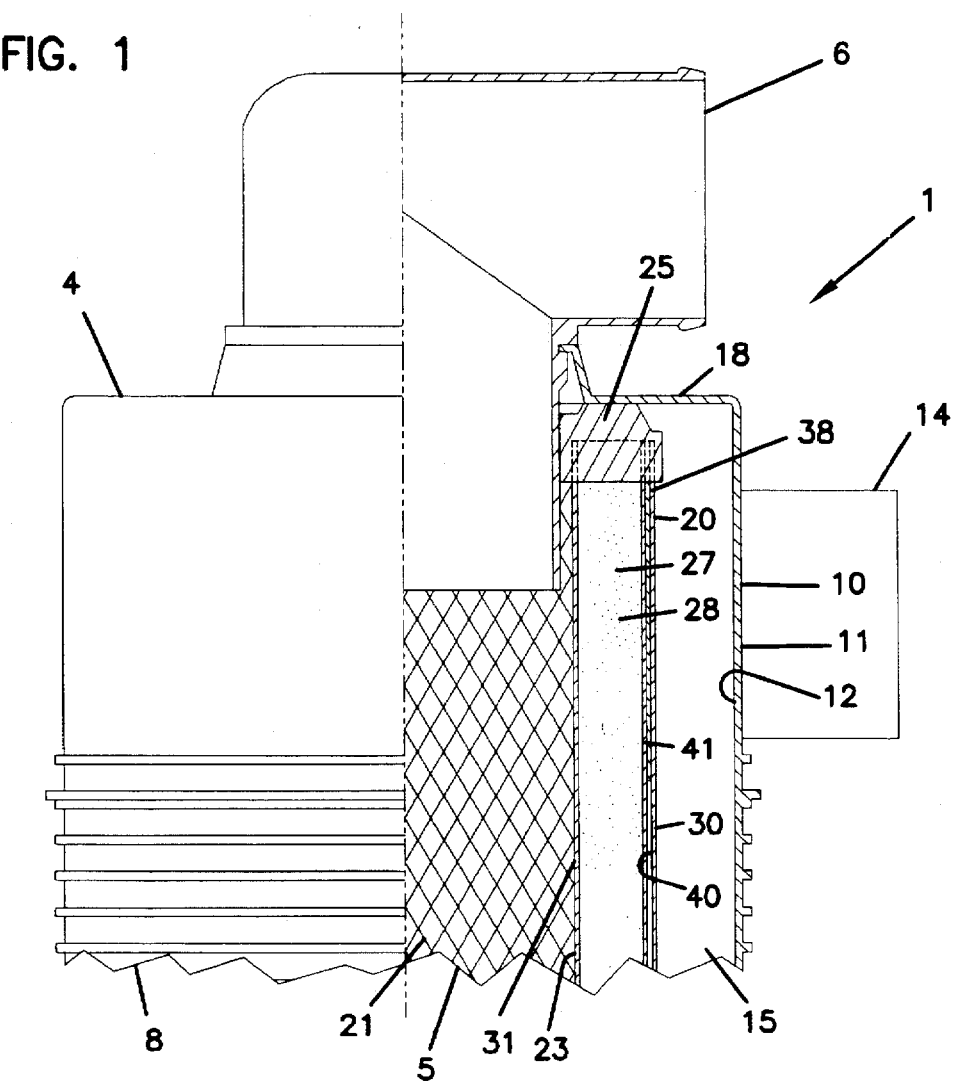
FIG. 1 is a schematic, fragmentary, side elevational view of an air filter construction according to the present invention.

Consider a conventional system in which a cylindrical, removable and replaceable, filter element is positioned in a housing that utilizes a centrifugal separator or precleaner as part of the filtering process. The filter element generally comprises cylindrically arranged pleated paper filter media embedded in, and extending between, two end caps, one of which is open the other of which is closed. Positioned around an outer perimeter of the cylindrical paper element, is an outer liner. The outer liner generally comprises perforated metal or expanded metal. Typical such filter elements also include an inner liner, also generally comprising perforated metal or expanded metal.

The air to the filter is generally directed into the housing in a direction tangential to the filter element and adjacent one end cap. The air stream swirls or coils around the filter element outer surface before it enters the media. Sometimes the housing includes internal structure to facilitate this. Eventually the air passes through the outer liner, the filter media and the inner liner, to an internal chamber within the filter element. The air at this point has been filtered by the filter media, and is directed to an outlet. Precleaning occurs because heavier and/or larger particulate matter which is carried within the air stream, as a result of the swirling motion, is directed against the inner side of the housing, rather than the filter media, and drops out of the air stream as it slows down. This particulate material will escape the air flow stream, and drop to the bottom of the air filter. Thus it is not loaded onto the filter element. Rather, the filtering conducted by the filtering element is generally of finer particulate material carried in the air stream, as the air stream generally ceases its circular or helical motion and turns inwardly through the filter element.

In such conventional systems, a substantial amount of turbulence is associated with the air flow at the entry port into the system. Such turbulence can stress or rattle the pleats of the paper media at this location somewhat, cause a weakening, and sometimes failure, of the paper media at this location. In some systems the housing includes internal structure, to inhibit this.

Also, to some extent the air flow may be directed against the pleated paper media in the vicinity of air entry into the circular flow system, especially if the housing does not include a guard structure at this location. This can cause premature loading of the filter media at this location, with larger particulate material. Also the particulate material, if it is directed against the media at this location, can damage the media.

In some systems, instead of structure in the housing, the outer liner is designed not to be perforated at this location, i.e. at a location immediately adjacent the air entry port to the housing. In this way, scattered, heavier, particulate material cannot readily reach the pleated paper media at this location. Also the filter media behind the lining at this location will be subject to less stress.

There has been a general movement toward the utilization of expanded metal materials as outer liners for filter elements, as opposed to perforated but non-expanded metal materials. Expanded metal materials are generally preferable, because they are less expensive to produce than perforated non-expanded metal materials. However, it is difficult to develop expanded metal materials that have portions that are not "open". Thus, it has generally been undesirable to use expanded metal materials as the outer liner, if it is desired to have a closed region immediately adjacent to the inlet of the housing; or, if expanded metal is used, an internal housing structure to protect the filter element has been used.

II. General Features of Improved Elements

According to the present invention, filter elements are improved by positioning a shield or screen arrangement along a downstream side of the outer liner, typically between the outer liner and the filter media. The preferred screen is a generally impervious film positioned at this location. By "impervious" in this context it is meant necessarily that the material does not readily allow air and particulate flow therethrough. By "impervious" it is not meant that gas diffusion through the material is impossible, but rather that the material generally operates as a barrier to substantial windflow or air current flow. A preferred such material is 0.1 to 1.0 mm polymeric material such as polypropylene or polyethylene.

By the reference "along a downstream side" of the outer line, it is not meant that the screen arrangement necessarily is adjacent to, or in direct contact with, the outer liner, but rather that it is in a position to block air flow at this location from the outer liner directly to the pleated paper. However, in typical preferred systems it will be convenient to position a portion of the screen arrangement in contact with an inner surface of the outer liner. By the term "directly to" in this context, reference is meant to air flow along a path generally perpendicular to the outer liner; i.e., for a cylindrical element, perpendicular to a central, longitudinal axis.

By the same token, it is not necessarily the case that the screen arrangement is in contact with the filter media on a downstream side of the screen arrangement. What is important, is that the screen arrangement be positioned to block air flow directly to the pleated paper, from the outer liner, at the designated location.

It is noted that, in general, in preferred systems the screen arrangement will abut both the outer liner and the media at locations where the sleeve arrangement is located. Herein, the term "between and against", the outer liner and the filter media, is used to describe this relationship. That is, when the phrase "between and against" is used in this context, it is meant that the sleeve abuts both the outer liner and the filter media, in the portion of the filter element at which it is located.

In a typical preferred system, the screen arrangement will be secured in position, typically by being partially embedded in the end cap material, along with the media.

With such preferred systems, the outer liner can conveniently be expanded metal, since the "screen" will provide for an impervious section. In typical arrangements the screen arrangement will extend about 40 mm to 240 mm, more typically 40 to 190 mm, along the length of the filter element, from the end cap toward the center of the element; i.e., along the longitudinal extension of the element, typically with about 10 mm embedded in the end cap. Thus, in such systems, the sleeve will typically be about 50 to 250 mm long. In some preferred arrangements such a screen arrangement will be positioned in both ends of the filter element, depending upon the filter element design. Such an arrangement will be particularly desirable if the filter element is designed to be inserted with either one of the filter element end caps adjacent the air inlet of the housing.

The invention will be further understood from the descriptions below with respect to FIGS. 1–4, in which an embodiment of the present invention is depicted; and, from FIG. 5, in which an alternate embodiment is depicted.

III. A Preferred Embodiment of the Invention

Reference number 1, FIG. 1, generally depicts a filter assembly according to the present invention. In FIG. 1 the filter assembly 1 is shown in a fragmentary side elevational view. The filter assembly 1 includes a housing 4, filter element 5 and air outlet 6. Referring to edge 8, the housing 4 is shown fragmented. The remainder of the housing 4 beyond this edge 8 (not shown) may be conventional, if desired. Such a housing 4 is shown in phantom, in FIG. 4.

In general it would include a cover hatch 9 by which access to the enclosed filter element is allowed. Also, it may include a collection and discharge arrangement 9A, for water and/or particulate material collected inside the housing.

Referring again to FIG. 1, the housing 4 generally includes an outer wall 10 having an outer surface 11 and an inner surface 12. The housing 4 further includes inlet 14. In general, in some systems the inner surface 12 of the housing wall 10, or other structure provided in housing 10, may be contoured or configured to facilitate air flow in a circular or helical pattern around the filter element 5, when the air flow is introduced into the housing 4. The housing 4 will typically comprise sheet metal or a molded plastic.

In a typical filter assembly 1, outer wall 10 will have a generally circular cross section; and, inlet 14 will be oriented to direct air generally in a tangential manner, i.e. along inner surface 12 in a circular or helical pattern around filter element 5, or, alternatively stated, substantially tangentially to filter element 5 rather than directly thereagainst. This is depicted schematically in FIG. 4, see arrows 16. Thus, the air flow will be initially directed around filter element 5 in inner chamber 15, FIG. 4. As a result of the circular motion, heavier, larger, particulate material carried in the air will tend to settle or separate from the air stream before the air stream is directed through the filter media of the filter element. This particulate material will generally drop to the bottom of the filter assembly 1, and can be collected thereat, without being collected on the surface of the filter element 5. This type of system is generally referred to as a "precleaner", and the process as "precleaning". It is commonly utilized in many types of filter systems, for example CYCLOPAC systems available from Donaldson Company, Inc. The region around the filter element, but inside of wall 10, may generally be referred to as a "particulate collection chamber" of the precleaner.

Referring again to FIG. 1, housing 4 includes end surface 18. A corresponding opposite surface, not shown, would typically be positioned in an opposite end of the housing.

Filter element 5 includes an outer surface 20, and an inner surface 21. For the system shown, the outer surface 20 is generally the upstream surface, against which air to be filtered is eventually directed. The inner surface 21 is the downstream surface, from which filtered air exits filter element 5. For the arrangement shown in FIG. 1, the filter element 5 is generally cylindrical in configuration and the inner surface 21 defines an inner clean air plenum or chamber 23.

For the particular preferred embodiment shown, filter element 5 includes a first end cap 25, a second opposite end cap 26 (FIG. 4) and filter media 27 extending therebetween. Preferably the media 27 includes portions embedded in each of the end caps 25 and 26, securing the media 27 in position. In the preferred embodiment shown, the media 27 comprises pleated paper media 28, with longitudinal pleats extending between the end caps 25, 26. A wide variety of media can be used, with preference relating to cost, availability and desired efficiency. The media selection generally does not directly related to the general principles of the invention. A useful media 28 would be Donaldson's ULTRAWEB® or ULTRATECH® material, a cellulose or synthetic media with a fine fiber layer thereon. Such a material is very efficient.

Figure 2:
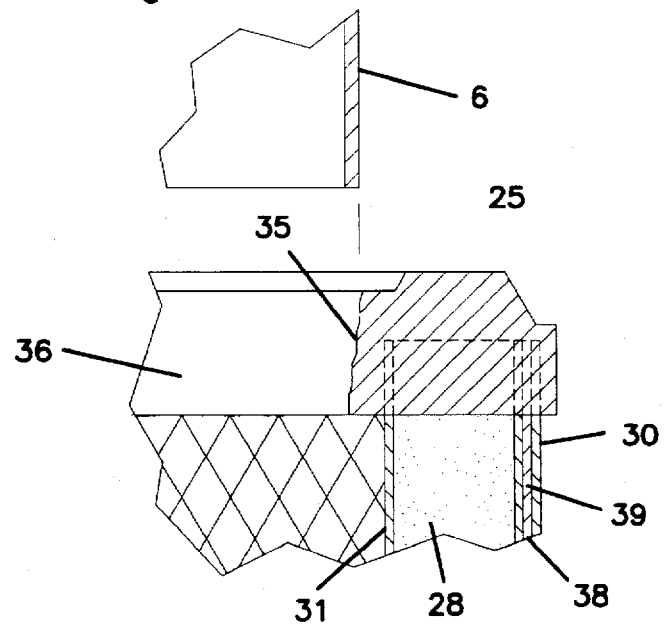
FIG. 2 is an enlarged, exploded, fragmentary cross-sectional view of a portion of arrangement shown in FIG. 1.
Figure 3:
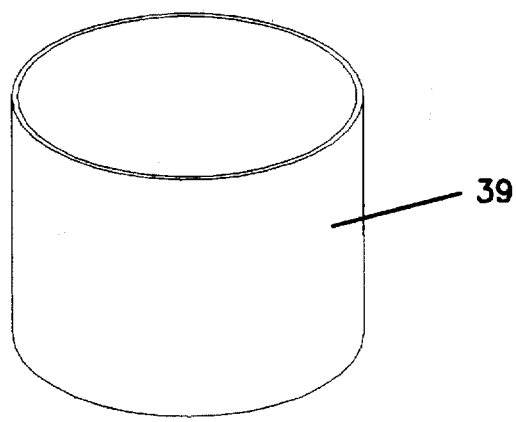
FIG. 3 is a perspective view of a sleeve arrangement useable in a filter element according to the present invention.

Referring to FIGS. 1 and 3, the filter element 5 also includes outer liner 30 and inner liner 31. Each of these liners 30, 31 is open or perforated, that is, air can pass through them. Preferably at least 50% of the area of each is open, more preferably at least 60% is open. In a preferred arrangement shown, outer liner 30 and inner liner 31 each comprise expanded metal such as 70–75%, i.e. about 72%, open area expanded metal. Generally and preferably each of outer liner 30 and inner liner 31 includes a portion embedded in each of the end caps 25 and 26, as shown at 32 and 33 in FIG. 2, for end cap 25.

For the arrangement shown, end cap 25 is an open end cap, i.e. it has central aperture 35 therein, FIG. 2. In the particular arrangement shown, the end cap 25 comprises soft urethane material and includes a portion 36 configured for forming a circular radial seal with outlet number 5. Such seals are described for example in U.S. Pat. No. B2 4,720, 292, incorporated herein by reference.

The variety of polyurethanes, polypropylenes, polyethylenes, polyesters, nylons, polytetrafluoroethylenes, polyvinylidene fluorides, polyamine diamides, mixtures thereof and even other polymers are usable polymeric material for end caps of filter arrangements according to the invention. Preferably soft foamed polyurethanes are used when radial seals are desired. A preferred material for the end caps is a soft polymeric urethane material, such as hydrofluorocarbon (HFC)-blown BASF I-35453R resin available from BASF Corp. in Wyandot, Mich. It is noted that a water-blown resin available from BASF having about the same density is also usable.

Preferably the polyurethane used will be processed to an end product having a molded density of about 14–22 pounds per cubic foot (lbs/ft$^3$) and a hardness of about 10 to 40, Shore A. The most preferred polyurethane comprises material made with the I-35453R resin and I-3050U isocyanate also available from BASF Corp. The material should be mixed in a mix ratio of 100 parts I-35453 resin to 36.2 parts I-3050U isocyanate (by weight). Typically, the specific gravity of the I-35453 resin is 1.04 (8.7 lbs./gal.), and for the isocyanate it is 1.20 (10 lbs/gal.). The materials are typically mixed with a high dynamic sheer mixer. The component temperatures are typically about 70–95° F. and the mold temperature is typically about 115–135° F.

A variety of preferred configurations for the end cap will generally depend upon the particular configuration of the housing and seal arrangement chosen. The configuration chosen will in general not dictate, or be of great concern with respect to, features of the improvement relating to sleeve arrangements according to the present advances.

Figure 4:
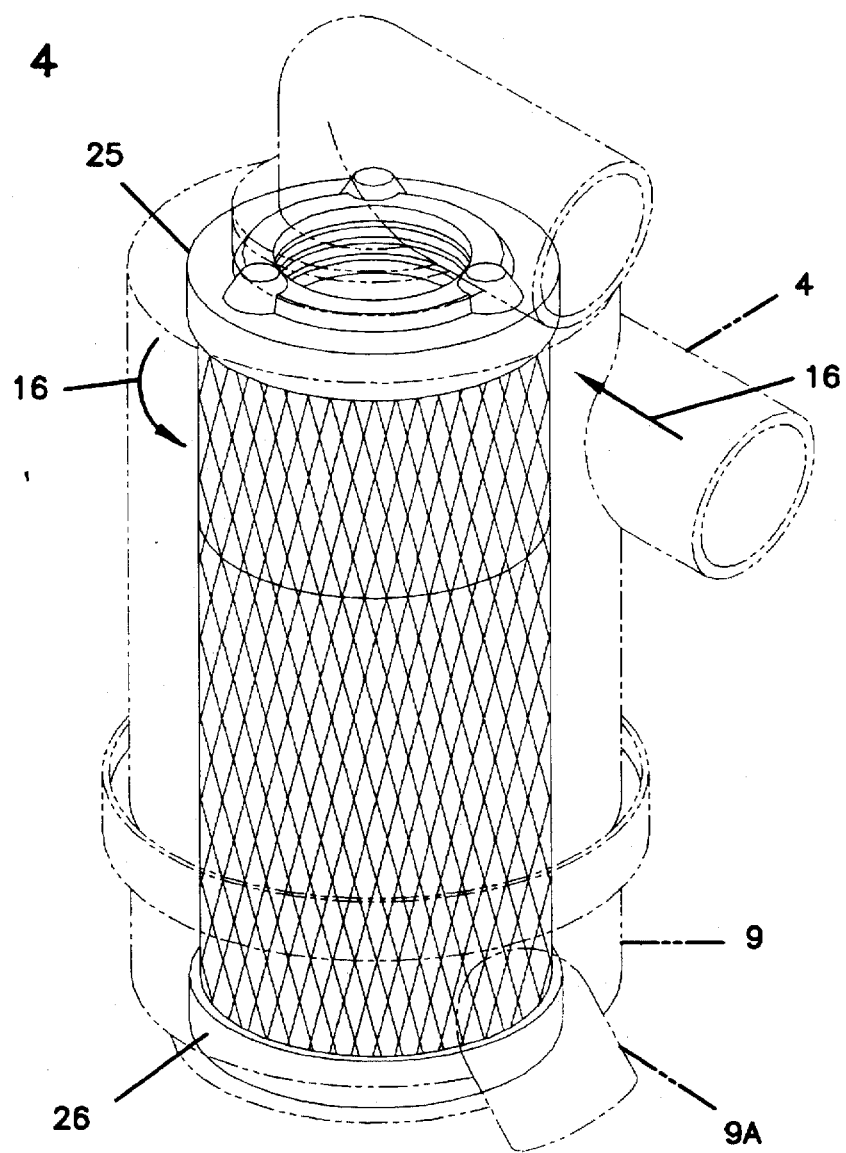
FIG. 4 is a schematic view of a filter element and air flow pattern in a typical preferred system, with portions of a useable housing shown in phantom.

For the arrangement shown in FIG. 4, the second end cap 26 is generally closed. That is, it does not include a central aperture. Thus, for air to reach inner chamber 23 it will generally have to have passed through media 27 and have been filtered.

Filter elements 5, FIG. 1, according to the present invention, include a screen arrangement or member 38 therein. The screen arrangement 38 comprises a member positioned along an inner surface 40 of outer liner 30 and the outer surface 41 of media 27. For filter assembly 1 depicted in FIGS. 1 and 2, the screen arrangement 38 comprises a film 39 of polymeric material positioned at this location and partially embedded in the first end cap 25. The operative position of the film 39 can be best viewed in FIG. 2. In FIG. 3, the film 39 is depicted in perspective, separated from assembly 4.

Referring to FIG. 2, the film 39 generally comprises 0.1 mm to 1.0 mm polymeric film material positioned in this location. (Typical ones are about 0.50 mm thick.) It is secured in position by being partially embedded in end cap 25, typically to a depth of about 10 mm. It is preferably substantially impervious to air filter through. Thus, it will effectively "close" the filter elements to passage of air directly therethrough from outer liner 30, in the regions where the screen arrangement 38 is located.

Preferably the screen arrangement 38 extends along a longitudinal length of filter element 5 sufficiently to extend beneath the air inlet path or air inlet 14 when the filter element 5 is installed therein. This is shown in FIG. 1, with the screen arrangement terminating at 41. For typical systems this will be a length of at least about 40 mm and typically at least about 100 mm to 150 mm along the length of the filter element. It will be understood that the preferred length will vary, however, depending upon the size of the system. In typical systems, a filter element 5 will have a length of about 200 mm to 500 mm, and the air inlet 14 will have a diameter of about 50 mm to 200 mm. Thus, the screen arrangement 38 will extend at least about 40–190 mm along the filter element, from the end cap 25 (with 10 mm embedded in the end cap).

The screen arrangement 38 provides a variety of desirable effects. In general, it blocks air flow directly into the filter element in the region of the air inlet. This will facilitate the precleaning operation, without unnecessary loading onto the filter media of larger particulate material. Also, less structure in the housing may be needed to achieve desirable air flow. When pleated paper is involved, air flow or turbulence in the region of the air inlet 14 will be less likely to cause vibratory movement of the media, and possible media (pleat) damage in this region. Also the screen arrangement 38 will tend to operate as a spacer between the filter media 27 and the outer liner 40, reducing likelihood of damage to the filter media from rubbing against the outer lining 30. To some extent, the spacing effect can extend along portions of the length of the filter element 5 where the screen arrangement 38 is not located. This can be facilitated by having a second screen arrangement positioned at end cap 26.

In some other instances it may also be desirable to position screen arrangements analogous to arrangement 38, at both end caps. For example, if the filter element is open at both ends, it may be installed with either end located near the housing inlet.

Generally, it is foreseen that construction of filter arrangements 1 according to the present invention can be conducted utilizing variations in standard manufacturing techniques. In typical manufacture, the filter media is lined on the inside and outside by the inner and outer liners respectively, and then it is potted in the end cap material in a molding process. The screen arrangement 8 can be positioned along an inside of the outer liner, before the media is positioned thereagainst; or, along the outside of the media, before the outer liner is positioned therearound. There is no specific requirement that the screen arrangement 38 merely be cylindrical. It may have an end portion; fold or rim, for example, embedded in the end cap. However, typically it is foreseen that the screen arrangement 38 will comprise a thin, cylindrically shaped, film or cylinder as shown in FIG. 3, with each of its faces (internal and external) relatively smooth and featureless.

IV. A Typical System

The following general specifications will indicate what is presently foreseen as a typical arrangement according to the present invention. However it will be understood that the design may be utilized in a wide variety of systems and with a wide variety of materials, other than those mentioned.

The system will be particularly desirable in arrangements wherein an air flow within the range of 0.5 to 35 meters/min is anticipated. Such systems would include, for example, 2-stage air cleaners for trucks, busses or construction equipment.

The filter elements in such systems will generally be about 200 to 500 mm long, about 50 mm to 230 mm in inner diameter, and of about 90 mm to 320 mm outer diameter. The filter media for such systems will generally comprise a pleated paper media, for example using Donaldson PLEAT-LOC™ paper media organized with about 12 pleats per inch, along the outer circumference or perimeter. The pleat depth will typically be 15 mm to 50 mm.

The inner diameter of the housing will be about 260 mm, leaving about a 25 mm gap between the housing and the outer liner of the filter element. The air inlet for the filter element will be about 130 mm in diameter. The inner and outer liners will generally comprise conventional expanded sheet metal, typically about 0.7 mm thick. The open area will comprise generally about 60% to 75%, typically 72%, of the area of the liner.

The preferred end cap material will be the BASF polyurethane material previously described.

In such a system, the preferred screen arrangement will comprise about a 50 to 250 mm long film or cylinder, with about 10 mm being embedded in the end cap. Thus, it will extend along the outer liner a distance of about 40 to 240 mm. The film would comprise commercial polypropylene, for example available from WARDEL STOREYS, Bantham Works, Essex, England.

In the preferred arrangement described, the filter element will have one open end and one closed end. In such a system preferably there is only one screen arrangement, located adjacent to, and partially embedded in, the open end cap.

V. An Alternate Embodiment

Attention is now directed to FIG. 5. In FIG. 5, a filter element 100 according to an alternate embodiment of the present invention is depicted, in fragmentary cross-section. The particular filter element 100 depicted is a filter element 101 for axial sealing. In particular the filter element 101 includes an end cap 102 (typically metal or hard plastic) constructed and arranged for utilization in association with a seal ring 103 for sealing against a housing, not shown. The filter element 102 includes outer liner 105, inner liner 106, and pleated paper filter media 107. A screen arrangement 110 is shown positioned between outer liner 105 and media 107, extending partly longitudinally along the filter element from end cap 102. It will be understood that the various components would be potted in or secured to end cap 102 in a usual, conventional manner.

A purpose of the alternate embodiment in FIG. 5 is simply to illustrate that screen arrangements 110 according to the present invention can be utilized in filter elements constructed and arranged for axial sealing, in addition to ones such as shown in FIGS. 1–4, which are constructed and arranged for radial sealing. Conventional axial sealing techniques and technology can be utilized, for example.

What is claimed:

1. A filter arrangement comprising:
   (a) a housing;
   (b) a removable and replaceable cylindrical filter element operably positioned in said housing for filtering of air passing therethrough; said filter element comprising:
      (i) a first liner having regions open to passage of air therethrough; said first liner having an upstream surface and a downstream surface;

(ii) a region of filter media positioned downstream from said first liner; and
(iii) a screen arrangement positioned along a portion of said first liner downstream surface; said screen arrangement being substantially impervious to air flow through any portion thereof; and said screen arrangement being positioned to block said portion of said first liner to air flow therethrough and into a portion of said region of filter media; and, (c) a precleaner arrangement including:
(i) a tangential air inlet constructed and arranged to direct air flow into said housing in a circular pattern around said filter element; and,
(ii) a particulate collection chamber;

(d) said screen arrangement including a portion aligned with said tangential air inlet to inhibit air from passing into said air filter element without first passing in a circular flow at least partially around said filter element.

2. A filter arrangement according to claim 1 wherein:
(a) said filter element includes first and second, opposite, end caps;
(b) said first liner comprises an expanded metal outer liner of cylindrical configuration embedded in, and extending between, said first and second end caps; and
(c) said region of filter media comprises pleated paper media arranged in a cylindrical configuration with pleats extending longitudinally between said first and second end caps; said pleated paper media including end portions embedded in said end caps.

3. A filter arrangement according to claim 2 wherein:
(a) said screen arrangement comprises a film positioned between and against a portion of said pleated paper filter media and a portion of said outer liner.

4. A filter arrangement according to claim 3 wherein:
(a) said flexible film includes a portion embedded in said first end cap, and a portion extending a first length of extension at least 40 mm along said outer liner from said first end cap toward said second end cap; and
(b) said precleaner arrangement tangential air inlet is constructed and arranged to initially direct air flow around a portion of said filter element adjacent said first end cap.

5. A filter arrangement according to claim 4 wherein:
(a) said tangential air inlet is generally circular in cross section with an inner diameter no greater than said first length of extension.

6. A filter arrangement according to claim 1, wherein:
(a) said screen arrangement comprises a polymeric film.

7. A filter arrangement according to claim 1, wherein:
(a) said screen arrangement comprises a film about 0.1 mm to 1.0 mm thick.

8. A filter arrangement according to claim 1, wherein:
(a) said screen arrangement comprises a cylindrical sleeve of polymeric film material positioned between said first liner and said region of filter media.

9. A filter arrangement according to claim 8, wherein:
(a) said sleeve of polymeric film material is positioned against said first liner on one side; and, against said region of filter media on an opposite side.

10. A filter arrangement according to claim 8, wherein:
(a) said sleeve of polymeric film material comprises polypropylene.

11. A filter arrangement according to claim 1, wherein:
(a) said region of filter media comprises a cylindrical extension of pleated paper filter media.

* * * * *

UNITED STATES PATENT AND TRADEMARK OFFICE
CERTIFICATE OF CORRECTION

PATENT NO. : 5,700,304
DATED : DECEMBER 23, 1997
INVENTOR(S) : FOO

It is certified that error appears in the above-identified patent and that said Letters Patent is hereby corrected as shown below:

In column 7, line 22, insert —14.— after "inlet".

Signed and Sealed this

Eighth Day of September, 1998

Attest:

BRUCE LEHMAN

*Attesting Officer*  *Commissioner of Patents and Trademarks*